Patented Oct. 23, 1945

2,387,538

UNITED STATES PATENT OFFICE 2,387,538

DI-CYCLOHEXYL AMINE SALT OF ALKYL PHOSPHORIC ACID

Herschel G. Smith, Wallingford, and Troy L. Cantrell, Lansdowne, Pa., assignors to Gulf Oil Corporation, Pittsburgh, Pa., a corporation of Pennsylvania No Drawing. Application March 19, 1945, Serial No. 583,651

5 Claims. (Cl. 260—461)

This invention relates to a di-cyclohexyl amine salt of an alkyl phosphoric acid, and it comprises an oil-soluble, substantially neutral addition product of 3-methyl-butyl, 2-ethyl-hexyl acid phosphate and dicyclohexyl amine, said neutral addition product being useful as a rust preventive compound or rust inhibitor; and it further comprises methods of making said neutral addition product wherein the said acid phosphate and di-cyclohexyl amine are chemically combined together in approximately equimolecular ratios to produce a substantially neutral addition product, said addition product or amine salt being readily soluble in and miscible with hydrocarbons such as volatile hydrocarbon solvents, mineral oils, waxes, and the like; all as more fully hereinafter described and claimed.

This application is a continuation-in-part of our prior application Serial No. 420,439, filed November 25, 1941, which became U. S. Patent No. 2,371,852 on March 20, 1945. In that application, we have described and claimed improved anti-rust petroleum lubricants and mineral oil compositions containing minor amounts of the substantially neutral addition product of 3-methyl-butyl, 2-ethyl-hexyl acid phosphate and di-cyclohexyl amine as a rust inhibitor or rust preventive compound. The present application is directed to such rust inhibitors or rust preventive compounds, per se.

That is, the present invention relates to oil-soluble, substantially neutral di-cyclohexyl amine salt of 3-methyl-butyl, 2-ethyl-hexyl phosphoric acid. This oil-soluble amine salt may be represented by the following formula:

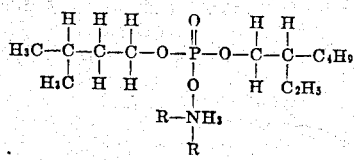

wherein R represents a cyclohexyl group. As shown by the above formula, this amine salt is an addition product of 3-methyl-butyl, 2-ethyl-hexyl acid phosphate di-ester and di-cyclohexyl amine. This addition product has a pH value of approximately 7.2; it being a substantially neutral amine salt.

This amine salt is a relatively stable compound under ordinary conditions. For instance, it can be heated to elevated temperatures; however, if heated to excessive temperatures, say, 260° F. or above, for long periods, it is converted into the corresponding amide compound, water being split off at such high temperatures. However, at temperatures below said conversion temperature, it is a relatively non-volatile material. Indeed, at such elevated temperatures, it is an oily liquid, being rather viscous at room temperature. Indeed, it becomes more or less crystalline at room temperature upon prolonged standing; it being definitely crystalline at lower temperatures. Accordingly, this amine salt is usually hot-blended with other ingredients, such as hydrocarbons, in preparing protective coating compositions containing small amounts of this amine salt. This is frequently done in incorporating it in waxes, petrolatums, and mineral oils.

Indeed, this amine salt is readily soluble in oils, both mineral oils and fatty oils. Of course, its solubility varies somewhat with the particular oil, but is quite high in general. Further, in addition to being readily soluble in mineral oils, it is readily miscible with other hydrocarbons, such as petrolatums, waxes, and volatile hydrocarbon liquids, and coating compositions containing the same; it being readily soluble in light hydrocarbon liquids, particularly volatile hydrocarbon solvents.

On the other hand, this amine salt is insoluble in water and aqueous liquids, and is resistant to hydrolysis. Indeed, this oily amine salt is quite water-repellent. Thus, it is an advantageous additive compound for incorporation in protective coating compositions for metals.

Further, when incorporated in hydrocarbons, such as mineral oils and the like, it imparts marked antirust properties thereto, as shown in our prior application Serial No. 420,439, now U. S. Patent No. 2,371,852. In other words, as described and illustrated in that application, our new amine salt is an excellent rust-preventive compound or rust inhibitor.

Further, as described in our prior application Serial No. 420,439, now U. S. Patent No. 2,371,852, this advantageous rust inhibitor can be readily prepared by reacting 3-methyl-butyl, 2-ethyl-hexyl acid phosphate with di-cyclohexyl amine in approximately equimolecular proportions; the reaction being so controlled as to produce a substantially neutral addition product having a pH value within the range of 5.5 to 7.5 (as measured with a quinhydrone-calomel electrode assembly), as there described.

The above-mentioned acid phosphate ester is a di-ester of ortho-phosphoric acid and has the following formula:

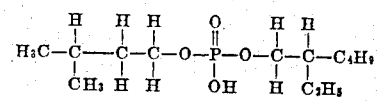

This compound is also known as 3-methyl-butyl, 2-ethyl-hexyl ortho phosphoric acid.

The other reactant, di-cyclohexyl amine, is a well-known chemical compound commercially available as a substantially pure material. This amine is a secondary amine, having a boiling point of 493° F. and a melting point of 32° F. It is readily soluble in mineral acids and light hydrocarbons. In preparing our amine salts from this amine, we may use the "C. P." amine; and this was usually done when a pure amine salt was desired. However, it is not necessary to use a "C. P." amine. Indeed, in commercial practice, we usually employ the commercial grades of this amine, which are readily available as substantially pure materials.

The di-cyclohexyl amine readily reacts with the 3-methyl-butyl, 2-ethyl-hexyl ortho phosphoric acid; the reaction being quite exothermic, as shown in our prior application Serial No. 420,439, now U. S. Patent No. 2,371,852. As there stated, in making our rust inhibitors from these reagents, the reaction temperature is carefully controlled. Usually, the reaction temperature is held between 140° F. and 200° F.; the reaction mixture being externally controlled, if necessary.

The following example illustrates certain advantageous embodiments of this invention:

*Example I.*—Into a suitable vessel, equipped with means for heating, cooling, and agitating the charge, there were introduced 181 pounds of di-cyclohexyl amine and then 281 pounds of 3-methyl-butyl, 2-ethyl-hexyl ortho phosphoric acid were gradually added with stirring. The reaction was vigorous and quite exothermic and the acid phosphate di-ester was added at such a gradual rate as to facilitate maintaining the reaction temperature below 180° F.; the reaction mixture being cooled, if required, to maintain it below that temperature.

After the exothermic reaction had subsided, a further 18 pounds of di-cyclohexyl amine were added and the reaction mixture stirred until the reaction was completed.

The di-cyclohexyl amine salt or rust inhibitor so obtained was an oily, viscous liquid at room temperature. It had a deep yellow color and a pleasant odor. It was readily soluble in liquid hydrocarbons, such as mineral oils, volatile hydrocarbon solvents, and the like. Also, it was readily miscible with petrolatum, waxes, and like hydrocarbons.

In general, the addition product obtained in the above example is soluble in a wide range of commercial mineral lubricating oils; it being more soluble in naphthenic type oils than in the paraffinic type oils. That is, it is useful in making various improved mineral oil compositions, as disclosed in our prior application Serial No. 420,439, now U. S. Patent No. 2,371,852. Further, this di-cyclohexyl amine salt or rust inhibitor may also be incorporated in other petroleum oils, such as heavy mineral oils, greases, petrolatums, waxes and other coating compositions. In fact, this oil-soluble rust inhibitor is broadly useful in manufacturing anti-rust coating compositions generally and may be incorporated in any petroleum lubricant or coating oil in which corrosion-preventive properties are desired, as described and claimed in our prior application Serial No. 420,439, now U. S. Patent No. 2,371,852.

What we claim is:

1. As a new composition of matter, useful as rust preventive compounds and for other purposes, the oil-soluble addition salt having the following formula:

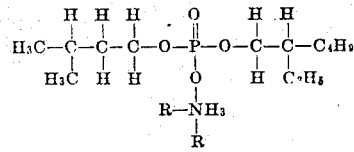

wherein R represents a cyclohexyl group, said amine salt being a substantially neutral compound soluble in mineral oils and miscible with hydrocarbons.

2. As a new composition of matter, the di-cyclohexyl amine salt of 3-methyl-butyl, 2-ethyl-hexyl phosphoric acid, said salt being a substantially neutral compound soluble in mineral oils and miscible with hydrocarbons.

3. As an improvement in the manufacture of oil-soluble, rust preventive compounds, the improved process which comprises reacting 3-methyl-butyl, 2-ethyl-hexyl phosphoric acid and di-cyclohexyl amine, in substantially equimolecular proportions, while maintaining the reaction temperature below 200° F., to produce substantially neutral addition products thereof.

4. The process of claim 3 wherein the said reaction is effected at temperatures between 140 and 200° F.

5. As an improvement in the manufacture of oil-soluble, rust preventive compounds, the improved process which comprises reacting di-cyclohexyl amine with 3-methyl-butyl, 2-ethyl-hexyl acid phosphate at temperatures between 140 and 200° F., the said amine and acid phosphate ester being reacted and combined in substantially equimolecular proportions to form substantially neutral addition products thereof.

HERSCHEL G. SMITH.
TROY L. CANTRELL.